United States Patent [19]

Herkenhoff et al.

[11] Patent Number: 4,570,246
[45] Date of Patent: Feb. 11, 1986

[54] METHOD FOR THE INTERPRETATION OF STATISTICALLY-RELATED SEISMIC RECORDS TO YIELD VALUABLE CHARACTERISTICS, SUCH AS GAS-BEARING POTENTIAL AND LITHOLOGY OF STRATA

[75] Inventors: Earl F. Herkenhoff, Orinda; Clint W. Frasier, Irvine; William J. Ostrander, Benicia, all of Calif.

[73] Assignee: Chevron Research Company, San Francisco, Calif.

[21] Appl. No.: 344,709

[22] Filed: Feb. 1, 1982

[51] Int. Cl.$^4$ .............................................. G01V 1/34
[52] U.S. Cl. ...................................... 367/68; 367/62; 367/74
[58] Field of Search ...................... 367/62, 56, 68, 43, 367/61, 38, 40, 74; 364/421

[56] References Cited

U.S. PATENT DOCUMENTS

| | | | |
|---|---|---|---|
| 3,354,985 | 11/1967 | Sparks | 367/56 |
| 3,622,967 | 11/1971 | Foster et al. | 367/62 |
| 4,008,459 | 2/1977 | Walker, Jr. | 367/56 |
| 4,316,267 | 2/1982 | Ostrander | 367/68 |
| 4,330,872 | 5/1982 | Bratton | 367/43 |
| 4,403,313 | 9/1983 | Garotta | 367/61 |

OTHER PUBLICATIONS

Neidell and Taner, "Semblance and Other Coherence Measures for Multichannel Data", *Geophysics*, vol. 36, No. 3, pp. 482–497 (1971).

*Primary Examiner*—Salvatore Cangialosi
*Assistant Examiner*—Gregory C. Issing
*Attorney, Agent, or Firm*—H. D. Messner; Edward J. Keeling

[57] ABSTRACT

In accordance with the present invention, progressive changes in amplitude as a function of offset of common gathers can be more easily identified by emphasizing the degree of amplitude variation between traces of each gather along a seismic line, and after generating semblance coefficients, displaying the resulting "weighted" offset traces or representations of such traces as function of either horizontal offset or centerpoint values. A significant —and progressive —change in P-wave reflection coefficient as a function of the angle of incidence (within sections) indicates valuable characteristics, say the fluid hydrocarbon-bearing potential and/or lithology of the reflecting horizon.

10 Claims, 17 Drawing Figures

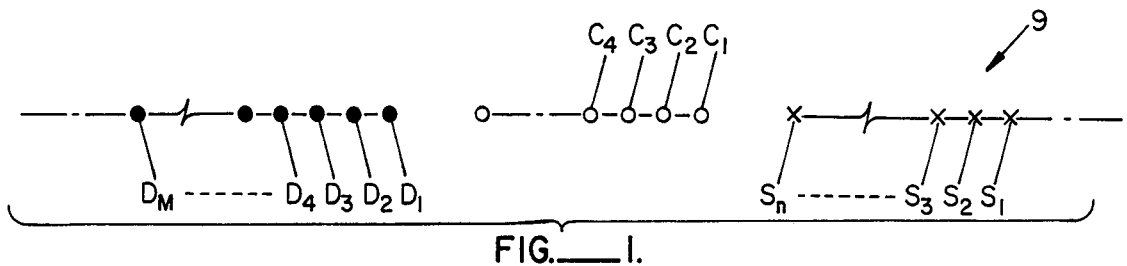
FIG.__1.
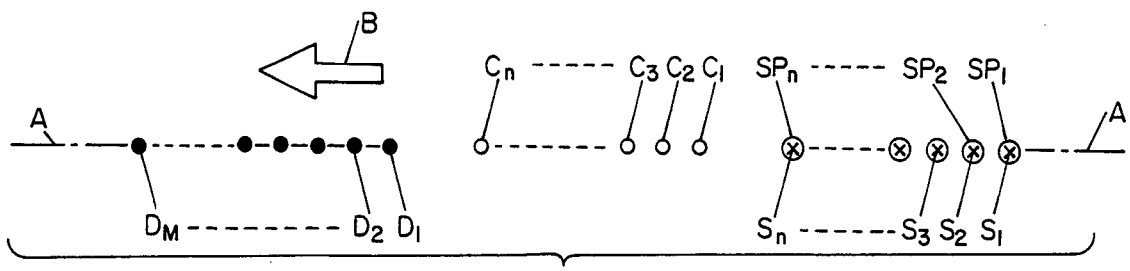
FIG.__5.
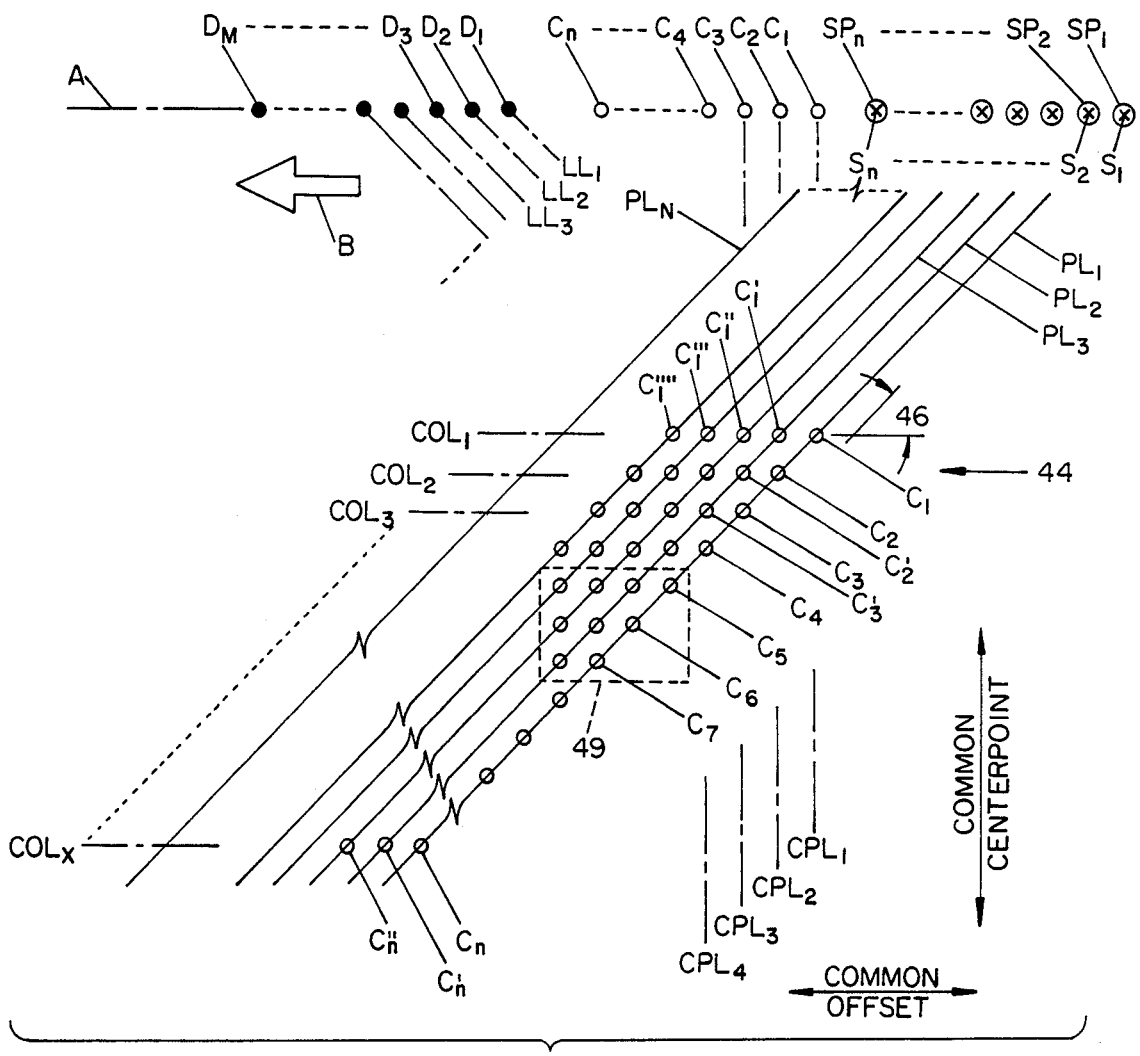
FIG.__6.

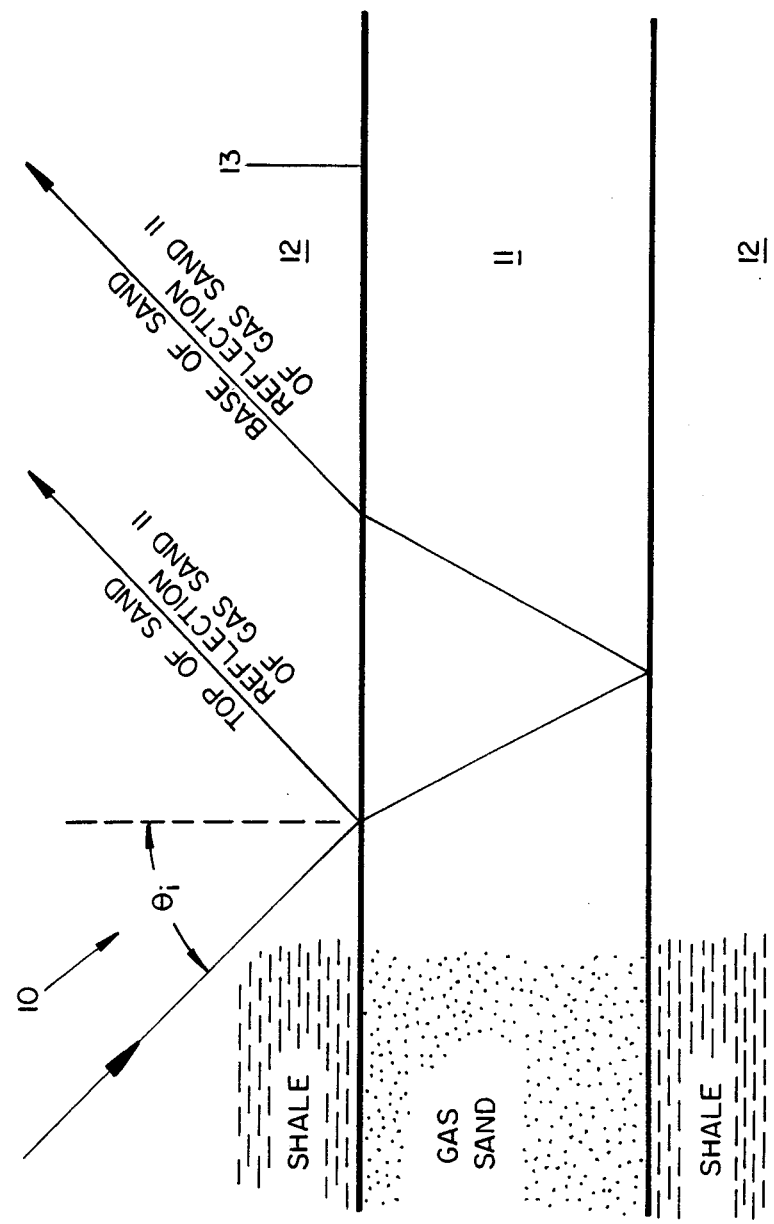
FIG._2.

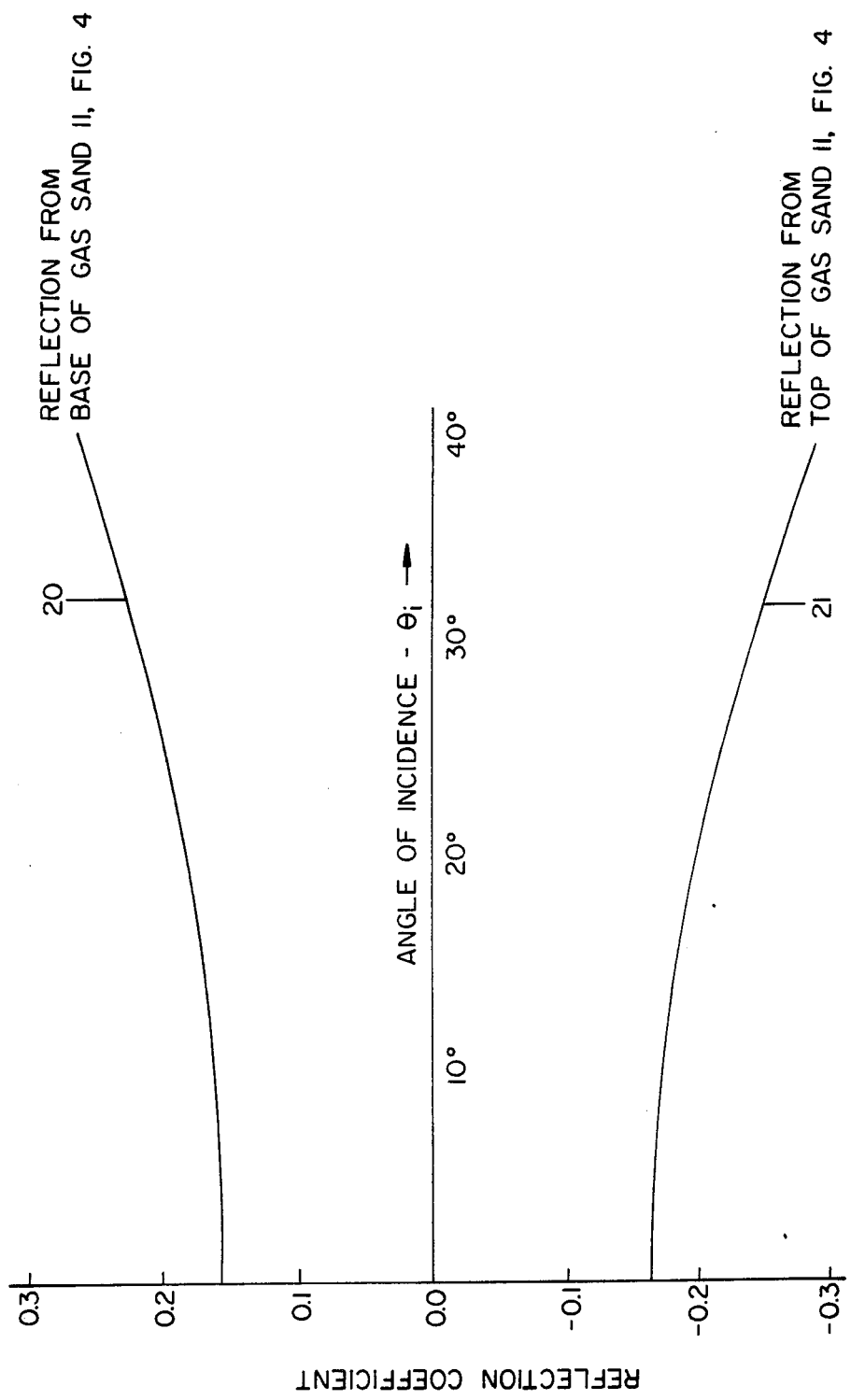
FIG._3.

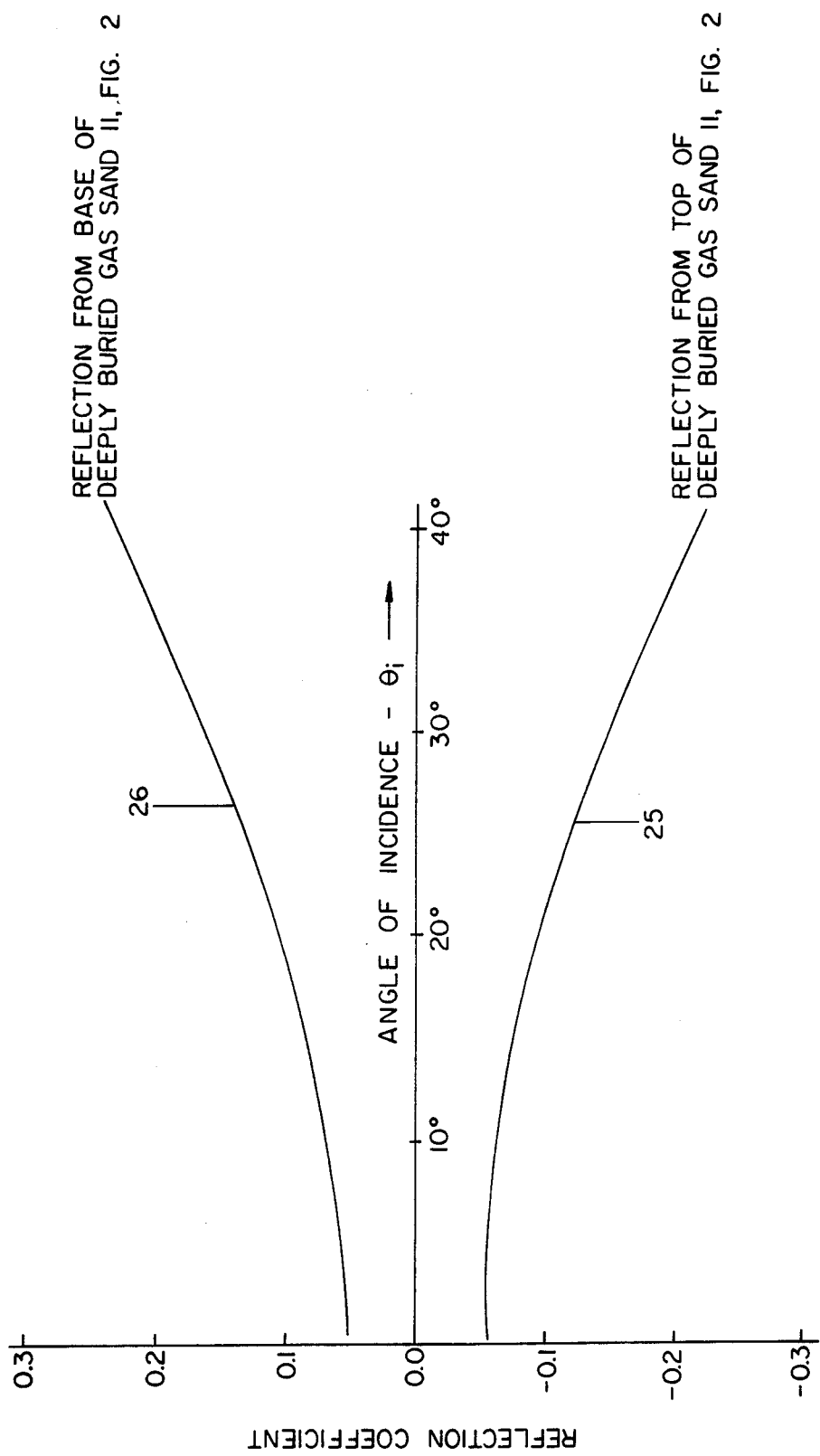
FIG._4.

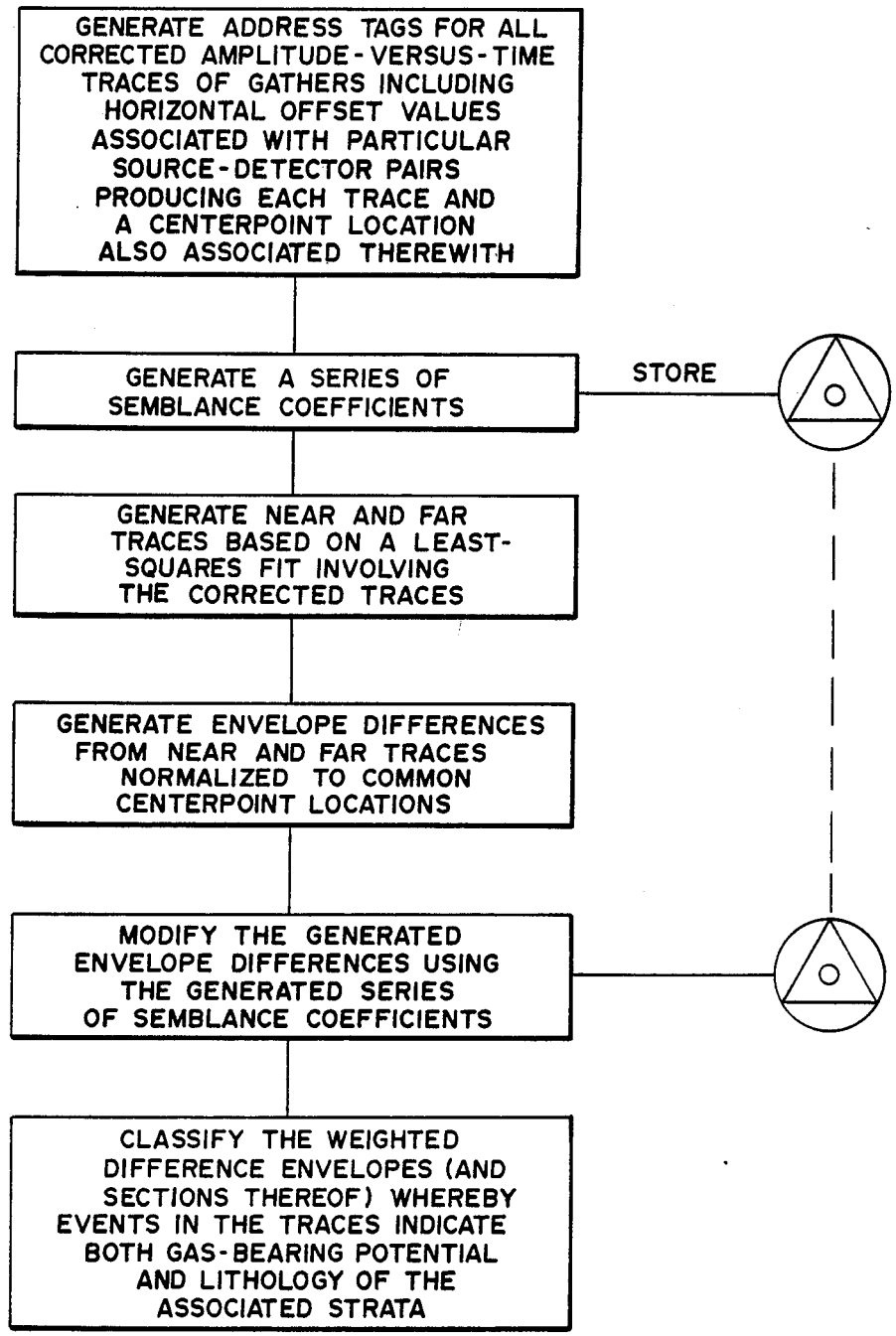
FIG _ 7

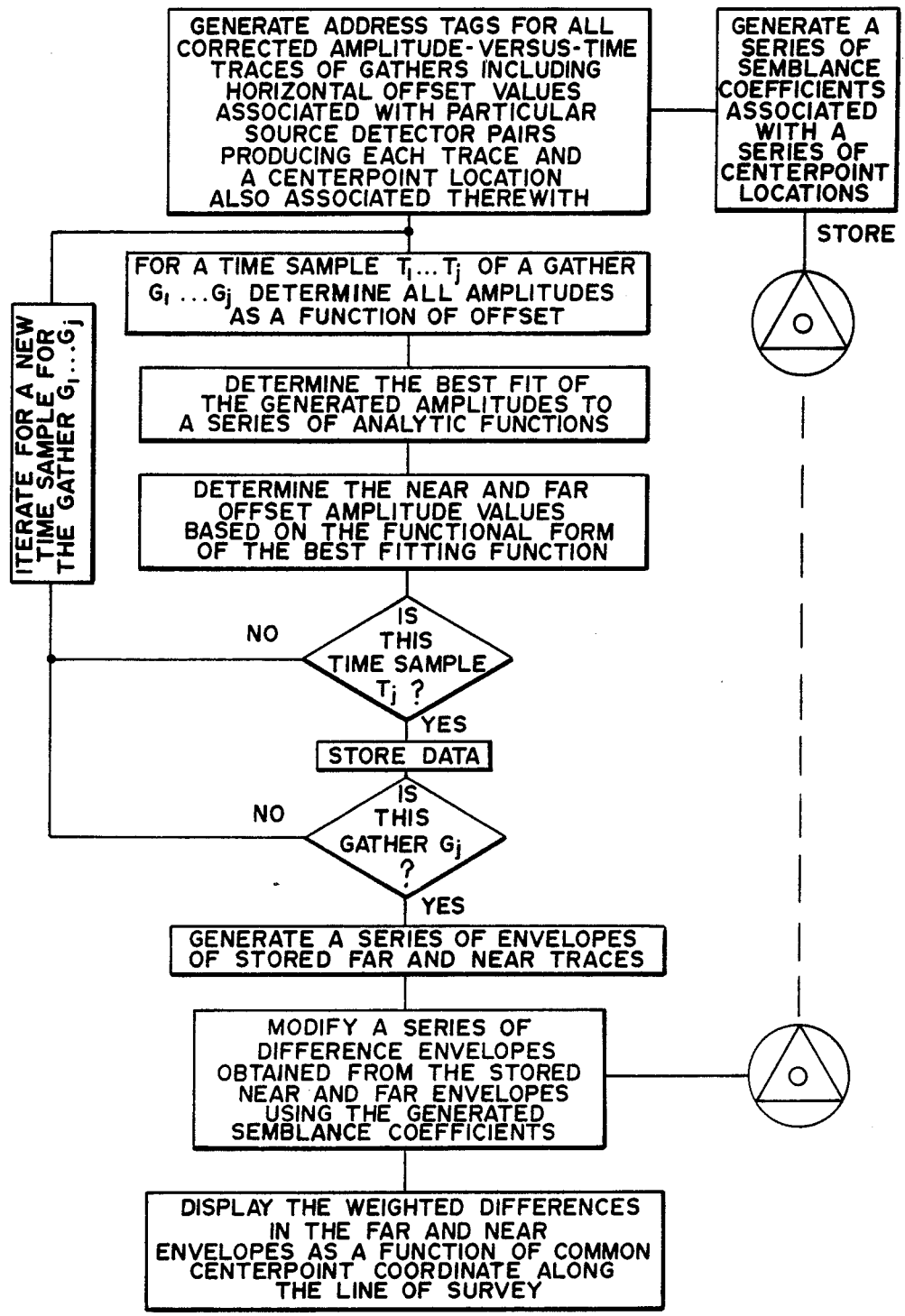
FIG_8

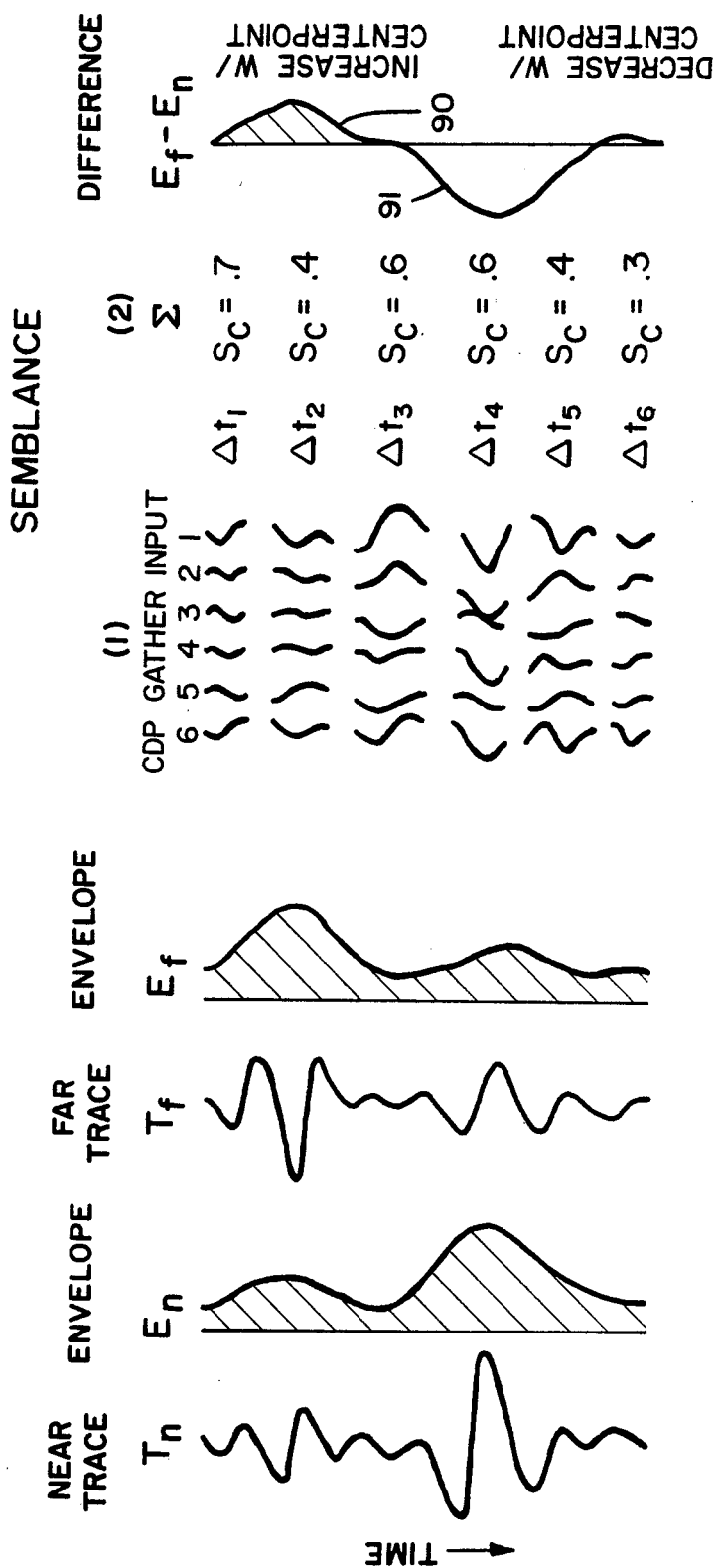
FIG_9

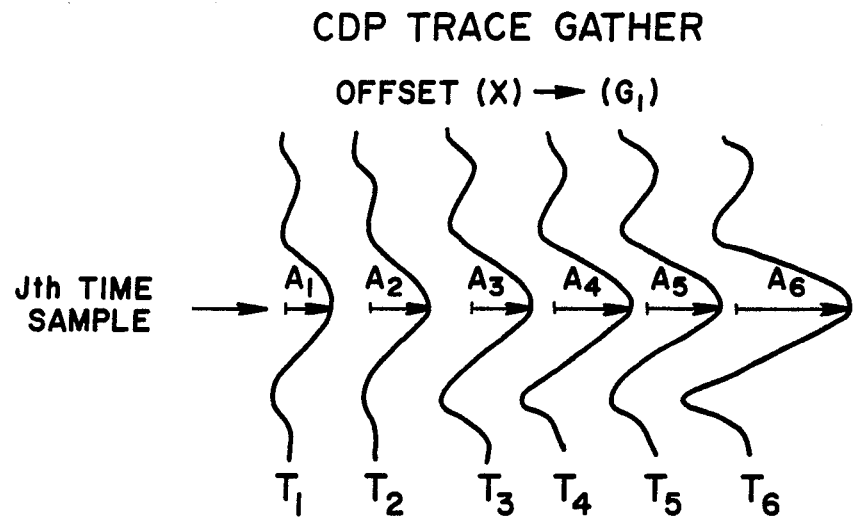
FIG _ 10A
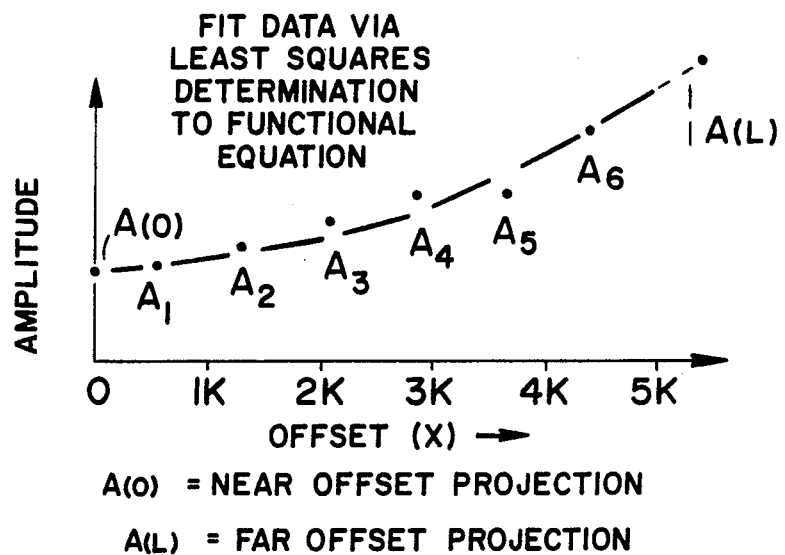
FIG _ 10B

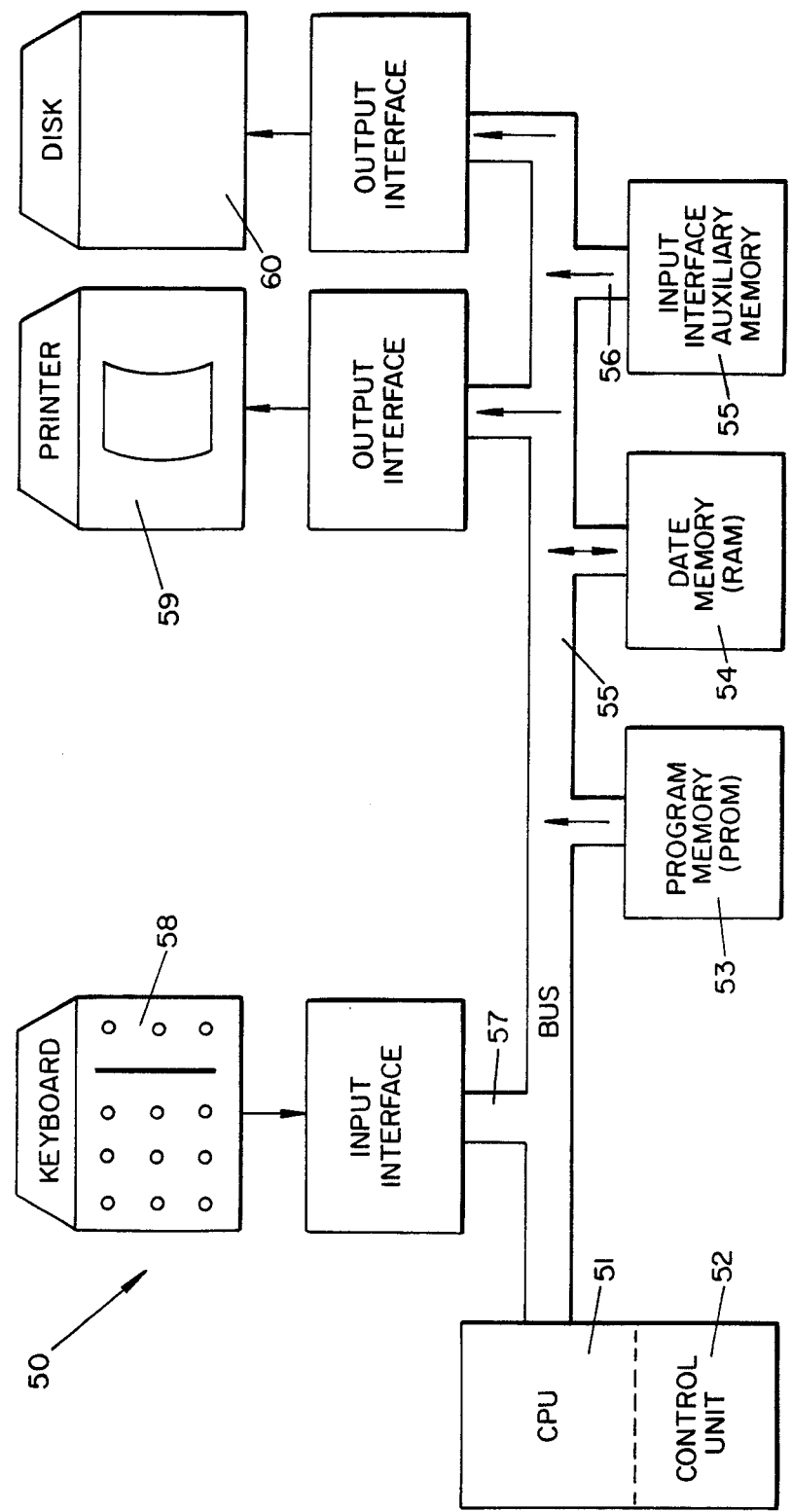
FIG.—11.

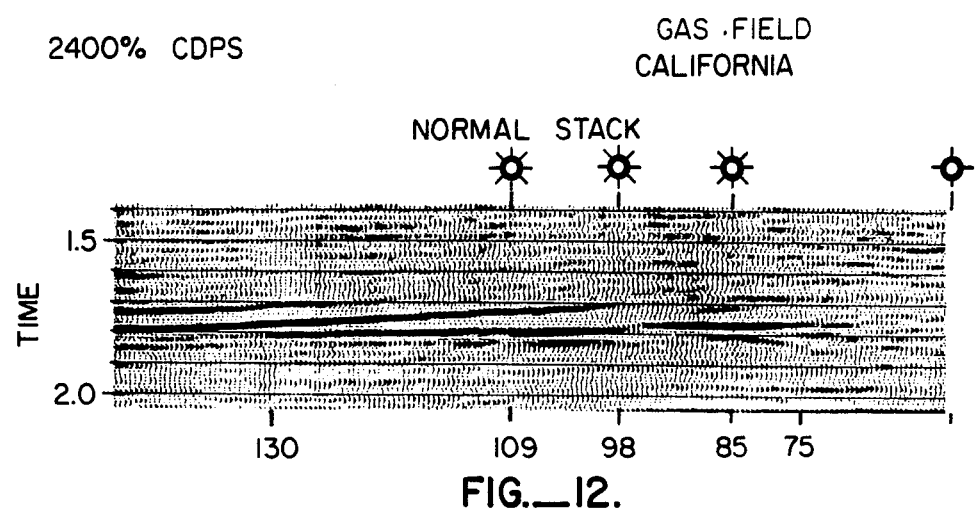
FIG._12.
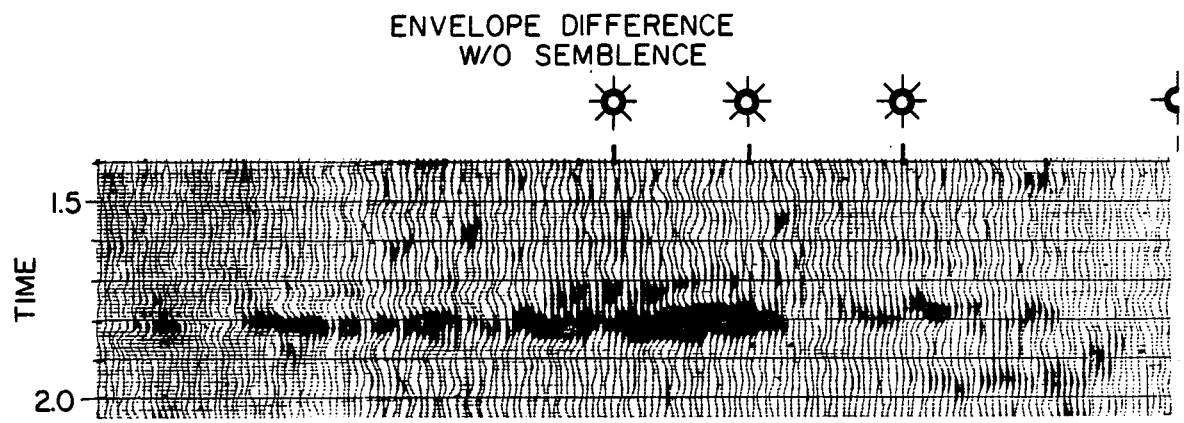
FIG._13.
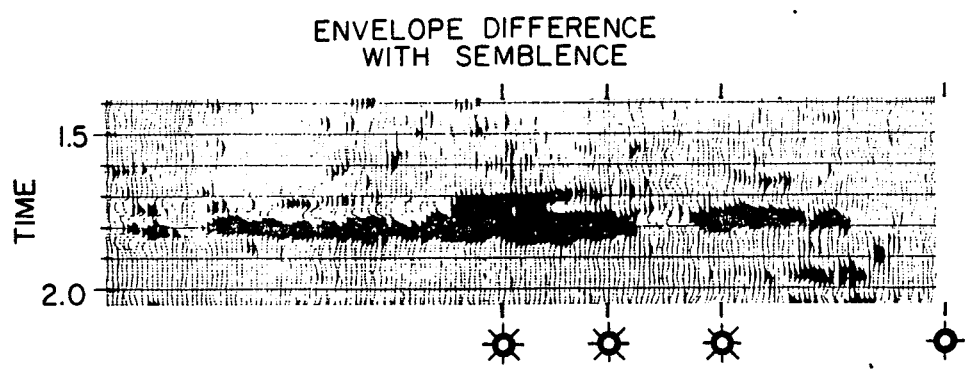
FIG._14.

1200% CDPS          GAS FIELD
                    COOK INLET, ALASKA
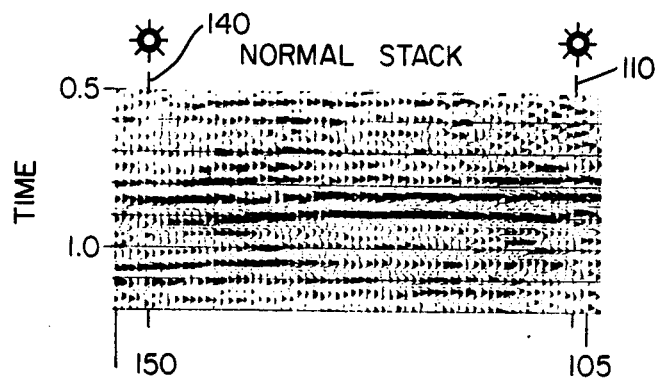
FIG._15.
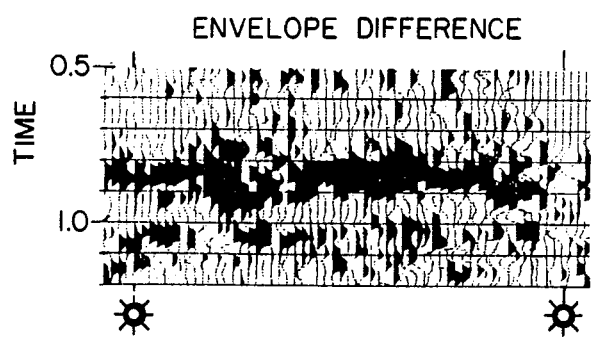
FIG._16.

METHOD FOR THE INTERPRETATION OF STATISTICALLY-RELATED SEISMIC RECORDS TO YIELD VALUABLE CHARACTERISTICS, SUCH AS GAS-BEARING POTENTIAL AND LITHOLOGY OF STRATA

CROSS-REFERENCE TO RELATED APPLICATIONS

This application relates to (i) Ser. No. 77,240 for "Method of Interpretation of Seismic Records to Yield Indications of Gaseous Hydrocarbons", assigned to the assignee of the present invention and now issued as U.S. Pat. No. 4,316,268, William J. Ostrander; and (ii) Ser. No. 316,013 filed Oct. 28, 1981, for "Method for Interpretation of Seismic Records to Yield Indications of the Lithology of Gas-Bearing and Capping Strata", W. J. Ostrander assigned also to the assignee of the present application.

CROSS-REFERENCE TO SIMULTANEOUSLY FILED APPLICATIONS

"Improved Method for the Interpretation of Seismic Records to Yield Valuable Characteristics, Such as Gas-Bearing Potential and Lithology of Strata"—E. F. Herkenhoff and W. J. Ostrander, Ser. No. 344,892, filed 2/1/82.

"Improved Method for the Interpretation of Envelope-Related Seismic Records to Yield Valuable Characteristics, Such as Gas-Bearing Potential and Lithology of Strata"—E. F. Herkenhoff and W. J. Ostrander, Ser. No. 344,904, filed 2/1/82.

FIELD OF THE INVENTION

The present invention pertains to the art of seismic prospecting for petroleum reservoirs by multiple-point surveying techniques, and more particularly to the art of converting high-intensity reflection amplitude anomalies associated with one or more common centerpoints observed on a seismic record into diagnostic indicators of, say both fluid hydrocarbon-bearing potential and lithology of the underlying subsurface strata. The present invention adds further to the authentication of such records as to the lithologic and fluid hydrocarbon-bearing character of the underlying strata via a statistically aiding, semblance measuring technique.

BACKGROUND OF THE INVENTION

Seismic prospecting for petroleum involves the creation of acoustic disturbances above, upon, or just below the surface of the earth, using explosives, air guns, or large mechanical vibrators. Resulting acoustic waves propagate downwardly in the earth, and partially reflect back toward the surface when acoustic impedance changes within the earth are encountered. A change from one rock type to another, for example, may be accompanied by an acoustic impedance change, so that the reflectivity of a particular layer depends on the velocity and density content between that layer and the layer which overlies it.

In early years, signal traces of the reflected acoustic waves were recorded immediately in the field as visible, side-by-side, dark, wiggly lines on white paper ("seismograms"). At present, the initial reproductions—in a digital format—are on magnetic tape, and finally are reduced to visible side-by-side traces on paper or film in large central computing facilities.

At such centers, sophisticated processing makes possible the distinction of signals from noise in cases that would have seemed hopeless in the early days of seismic prospecting. Until 1965, almost all seismic surveys conducted used an automatic gain control which continuously adjusted the gain of amplifiers in the field to account for decreasing amounts of energy from late reflection arrivals. As a result, reflection coefficients could not be accurately determined. However, with the advent of the expander circuit and binary gain amplifiers, gain of the amplifiers can now be controlled and amplitudes recorded precisely; this makes it possible to conserve not only the special characteristics of the reflections, but also their absolute amplitudes.

More powerful computers with array processors and economical floating point capabilities also now enable modern geophysicists to maintain control of the amplitude of all recorded signals. The "floating point" capability is especially effective in expanding computer work size by a large factor and in eliminating the need for computer automatic gain control. As a result of the above advances, reflections from many thousands of feet below the earth's surface can now be confidently detected and followed through sometimes hundreds of side-by-side traces, the shortening or lengthening of their corresponding times of arrival being indicative of the shallowing or deepening of actual sedimentary strata of interest.

Apropos of the above has been use of ultra-high amplitude anomalies in seismic traces to infer the presence of natural gas in situ. Seismic interpreters have used so-called "bright-spot" analysis to indicate several large gas reservoirs in the world, especially in the Gulf Coast of the United States. Such analysis is now rather common in the oil industry, but it is not without its critics. Not only cannot the persistence of such increased amplitude anomalies be taken as confirmation of the lateral extent of the gas reservoir, but also the anomaly itself (in some cases) may not represent reflections of a discontinuity of a gas-bearing medium and its over- or underlying associated rock strata.

However, the problem as to the degree an interpreter can rely on high-intensity anomalies, in these regards has recently been brought to manageable proportions. In the above-identified copending applications, it is taught that gas-bearing potential and the lithology of one host and cap rock strata can be accurately determined by: (1) obtaining field data in which the data of common centerpoints are associated with more than one source-detector pair, (2) indexing the data whereby all recorded traces are indicated as being a product of respective source-detector pairs of known horizontal offset and centerpoint location, (3) thereafter, associating high-intensity amplitude anomalies in the traces in a manner that allows determination of both gas-bearing potential and the lithology of the host and cap strata to a surprisingly accurate degree.

The present invention further improves the ability of the seismologist to correctly identify valuable characteristics, such as lithology and authenticate presence of hydrocarbonaceous fluids using certain statistically-aided occurrences in amplitude with offset of such high-intensity anomalies of the seismic records to differentiate the former from similarly patterned reflections of other types of configurations containing no gas accumulations. If source and receiver characteristics are constant and if the geological section does not change as the measuring points move over the surface of the earth, it is axiomatic that the reflection traces would also be constant. That is to say, there would be at the maximum, a constant scale factor difference between corresponding values on successive seismic traces. But experience shows that each trace is different from the preceding or the following trace. While the degree of coherence or correlation can be defined mathematically say, as being related to the cross-correlation coefficients generated between equivalent time windows of the compared traces, the present invention relates primarily to the use of a different type of measurement of trace similarity, viz., one that instantaneously qualifies whole portions of the gather (rather than on a trace-by-trace basis).

SUMMARY OF THE INVENTION

In accordance with the present invention, progressive changes in amplitude as a function of offset of common gathers can be more easily identified by emphasizing—with the aid of statistics—the degree of amplitude variation between (i) near offset and (ii) far offset traces (relative to a common sourcepoint) of each gather along a seismic line, and displaying the resulting sections as a function of centerpoint locations along the seismic line. Result: the interpreter can easily follow progressive amplitude change in a manner that allows determination of valuable characteristics, such as fluid hydrocarbon-bearing potential, and lithology of the host and cap rock strata, to a surprisingly accurate degree.

In accordance with the present invention, systematic generation of statistically-aided sections, is provided in a surprisingly efficient manner using pattern recognition methods that (although conventional in the data communications field) have not been used in the context here employed.

Semblance coefficients as a function of time and common centerpoints are first generated, say of the form:

$$S_c = \frac{1}{M} \frac{\sum_{j=K-\frac{1}{2}N}^{K+\frac{1}{2}N} \left[ \sum_{i=1}^{M} f(i,j) \right]^2}{\sum_{j=K-\frac{1}{2}N}^{K+\frac{1}{2}N} \sum_{i=1}^{M} [(f(i,j))]^2}$$

where: $f(i,j)$ is the $j^{th}$ sample of the $i^{th}$ trace; M traces are summed and the coefficient $S_c$ is evaluated over a window of width N, centered at point K on the original time sample. Next, after storage, such coefficients are used to modify subsequently generated by difference envelopes of near and far traces.

Assume, for example, that a $T_1$th time sample exists for a gather of traces. In order to carry out the process of generating near and far offset traces for such a time sample, the traces amplitudes associated with the $T_1$th time sample must be generated, i.e., the $A_{T_1}$'s for the sample $T_1$. Next, there is a fit of the formulated $T_1$'s to a series of linear and quadratic functions of the form: (i) $A(x) = C_0 + C_1 x$; (ii) $A(x) = C_0 + C_2 x^2$; and (iii) $A(x) = C_0 + C_1 x + C_2 x^2$. Object: to obtain a least squares best fit of the generated $T_1$ amplitudes to either equation (i), (ii), or (iii), supra, after which the amplitudes at preselected near and far values are calculated, and then stored. The process than can be repeated, and then re-repeated for sample times $T_2 \ldots T_j$.

Envelopes of the ultimately generated series of pairs of near and far traces (projected to preselected near and far locations offset from original field locations) are finally themselves modified by the prior generated semblance coefficients prior to their display as difference envelopes normalized to common centerpoints along the line of survey. Result: the interpreter can easily follow change in amplitude as a function of offset from section to section along the entire seismic survey line.

Further features of the invention will become more apparent upon consideration of the following detailed description of the invention when taken in connection with the accompanying drawings, wherein:

FIGS. 1, 5 and 6 are geometrical plan and transformed views of a grid of centerpoints produced from (i) an array of seismic sources and detectors and (ii) seismic processing whereby a series of locational traces associated with individual centerpoints between respective source-detector pairs can be associated together in a meaningful way;

FIG. 2 is a model of typical reflecting horizons within an earth formation that can be associated with the characteristics of the locational traces of FIGS. 1 and 6;

FIGS. 3 and 4 are plots of reflection coefficient as a function of angle of incidence of seismic waves associated with the reflecting horizons of FIG. 2; FIGS. 7, 8 and 9 are diagrams of processes akin to those shown in FIGS. 5 and 6 for carrying out the method of the present invention, using a programmed digital computing system;

FIGS. 10A and 10B are schematic diagrams illustrating certain steps of the flow diagrams of FIGS. 7, 8 and 9 in more detail;

FIG. 11 is a schematic diagram of elements within a typical digital computing system; and FIGS. 12-16 are true record sections and portions of sections, illustrating the diagnostic capability of the method of the present invention.

PREFERRED EMODIMENTS OF THE INVENTION

Before discussion of an embodiment of the invention within an actual field environment, it may be of interest to indicate lithology limitations associated with the present invention. For example, anomalies associated with gas sands over shale cap rock are one example in which the method of the present invention offers suprising results; another relates to gas-saturated limestone over shale. Also of importance is the relationship between Poisson's ratio and resulting high-intensity amplitude anomalies provided on seismic traces.

While Poisson's ratio ($\sigma$) has the general formula $$\sigma = \frac{\left[ \left( \frac{V_p}{V_s} \right)^2 - 2 \right]}{2 \left[ \left( \frac{V_p}{V_s} \right)^2 - 1 \right]} \quad (A)$$

where $V_p$ is compressional velocity and $V_s$ is shear velocity of the medium, this concept is not without physical significance. For example, considering a slender cylindrical rod of an elastic material and applying a compressional force to the ends, as the rod changes shape (the length of the rod decreasing by $\Delta L$, while the radius increasing by $\Delta R$), Poisson's ratio is defined as the ratio of the relative change in radius ($\Delta R/R$) to the relative change in length ($\Delta L/L$). Hence compressible materials have low Poisson's ratios, while incompressible materials (as a liquid) have high Poisson's ratios.

Equation (A) above indicates the relationship of the compressional and shear wave velocities of the material, $V_p$ and $V_s$ respectively; i.e., that Poisson's ratio may be determined dynamically by measuring the P-wave and S-wave velocities. Only two of the three variables are independent, however.

Recent studies on reflection and transmission seismic waves useful in geophysical applications include:

(1) Koefoed, O., 1955, for "On the Effect of Poisson's Ratios of Rock Strata in the Reflection Coefficients of Plane Waves", Geophysical Prospecting, Vol. 3, No. 4.

(2) Koefoed, O., 1962, for "Reflection and Transmission Coefficients for Plane Longitudinal Incident Waves", Geophysical Prospecting, Vol. 10, No. 3.

(3) Muskat, M. and Meres, M. W., 1940, for "Reflection and Transmission Coefficients for Plane Waves in Elastic Media", Geophysics, Vol. 5, No. 2.

(4) Tooley, R. D., Spencer, T. W. and Sagoci H. F., for "Reflection and Transmission of Plane Compressional Waves", Geophysics, Vol. 30, No. 4 (1965).

(5) Costain, J. K., Cook, K. L. and Algermisshi, S. T., for "Amplitude, Energy and Phase Angles of Plane SP Waves and Their Application to Earth Crustal Studies", Bull. Seis. Soc. Am., Vol. 53, p. 1639 et seq.

All of the above have focused on the complex modeling of variation in reflection and transmission coefficients as a function of angle of incidence.

The problem is complicated, however. E.g., isotropic media with layer index of the strata, $i=1$ for the incident medium and $i=2$ for the underlying medium, have been modeled using equations for P-wave reflection coefficient $A_{pr}$ and for P-wave transmission displacement amplitude coefficient $A_{pt}$. For each of the media, i.e., the incident or underlying medium, three independent variables exist: P-wave velocity, $\sigma$ and bulk density, or a total of six variables for both media.

But to provide for the many combinations of possible variations, the above-listed studies have either:

(a) generated many (literally thousands) plots of a mathematical nature for various parameters, values in which there was little relationship with true geophysical applications, since the latter were hopelessly obscured and unappreciated; or (b) made simplistic assumptions that, although using actual calculations, nevertheless did not express the true nature of transmission and reflection coefficients, in particular lithological situations associated with the accumulation of gaseous hydrocarbons within an actual earth formation.

While reference (2) concludes that change in Poisson's ratio in the two bounding media can cause change in the reflection coefficient as a function of angle of incidence, reference (2) does not relate that occurrence to lithology associated with the accumulation of gaseous hydrocarbons in the surprising manner of the present invention.

In the above-identified patent applications, it is taught that gas-containing strata have low Poisson's ratios and that the contrast with the overburden rock as a function of horizontal offset produces a surprising result: such contrast provides for a significant—and progressive—change in P-wave reflection coefficient at the interface of interest as a function of angle of incidence of the incident wave. Thus, determining both the gas-bearing potential and the lithology of host media is simplified by relating progressive change in amplitude intensity as a function of offset between source-detector pairs, i.e., angle of incidence being directly related to offset. However, there is still a need in some cases to further emphasize the degree of amplitude change as a function of offset especially with respective source-detector pairs associated with near and far offset locations of a gather of traces.

By the terms "near" and "far" offset locations, it is meant that such are measured with respect to the source locations associated with the original source points where the seismic waves were generated. Hence, they represent the degree of horizontal offset distance that exists between such field locations, the source and receiver as the data was collected in the field.

Now in more detail, attention should be directed to the Figures, particularly FIG. 1. Note that, inter alia, FIG. 1 illustrates in some detail how the terms of interest in this application are derived: e.g., the term "centerpoint" is a geographical location located midway between a series of sources $S_1, S_2 \ldots S_n$ of a geophysical field system 9 and a set of detectors $D_1, D_2 \ldots D_m$ at a datum horizon near the earth's surface. The centerpoints are designated $C_1, C_2 \ldots C_p$ in the figure, and are associated with a trace derived by placement of a source at that centerpoint location followed immediately by relocating a detector thereat.

I.e., if the sources $S_1 \ldots S_n$ are excited in sequence at the source locations indicated, traces received at the different detector locations shown can be related to common centerpoints therebetween, and a gather or group of traces is formed. I.e., if the reflecting interface is a flat horizon, the depth point where a reflection occurs will define a vertical line which passes through the centerpoint of interest. Applying static and dynamic corrections to the field traces is equivalent (under the above facts) to placing the individual sources $S_1, S_2 \ldots S_n$ at the centerpoint in sequence followed by replacement with the detectors $D_1 \ldots D_m$ of interest at the same locations. If the traces associated with a common centerpoint are summed, a series of enhanced traces, sometimes called CDPS (Common Depth Point Stack) traces, is provided. But before such traces are summed, such display can be enhanced to surprisingly indicate the presence of fluids in a host strata as well as the lithology of the latter.

FIG. 2 illustrates reflection phenomena of a three-layer model typical of a young, shallow geologic section 10, such as found in the Gulf Coast, illustrating how reflection phenomena associated with the traces associated with the field system 9 of FIG. 1 can be related to the presence of gas.

Section 10 includes a gas sand 11 embedded in a shale stratum 12. Assume a Poisson's ratio of 0.1 for the gas sand and of 0.4 for the shale, a 20% velocity reduction at interface 13, say from 10,000'/sec to 8000'/sec, and a 10% density reduction from 2.40 g/cc to 2.16 g/cc.

The actual P-wave reflection coefficient $A_{pr}$ can be related to section 10 by Equation (1) below; also, P-wave transmission displacement amplitude coefficient $A_{pt}$ can similarly be related in accordance with Equation (2) below.

$$A_{pr} = \frac{\bar{f} - \bar{\tau} - \bar{\chi}}{f + \tau + \chi} \quad (1)$$

$$A_{pt} = \frac{h_2 \cdot 2a_1 k_1^2 (C_1 \nu + C_2 \xi)}{h_1 (f + \tau + \chi)} \quad (2)$$

$$\frac{\bar{f}}{f} = k_1^2 k_2^2 \delta(a_1 c_2 \mp a_2 c_1) \quad (3)$$

$$\frac{\bar{t}}{\tau} = b^2 \eta^2 \mp a_1 c_1 \nu^2 \quad (4)$$

$$\frac{\bar{x}}{\chi} = a_2 c_2 (\xi^2 \mp 4 a_1 c_1 \zeta^2 b^2) \quad (5)$$

$$\eta = \delta\epsilon_2 - \epsilon_1 \quad (6)$$
$$\zeta = \delta - 1 \quad (7)$$
$$\nu = \delta\epsilon_2 + 2b^2 \quad (8)$$
$$\xi = \epsilon_1 + 2\delta b^2 \quad (9)$$
$$\epsilon_i = k_i^2 - 2b^2 \quad (10)$$
$$\delta = \mu_2/\mu_1 \quad (11)$$
$$\mu_i = \rho_i V_{si}^2 \quad (12)$$
$$b = h_1 \sin\theta \quad (13)$$
$$a_i^2 = h_i^2 - b^2 \quad (14)$$
$$C_i^2 = k_i^2 - b^2 \quad (15)$$
$$h_i = 1/V_{pi} \quad (16)$$
$$k_i = 1/V_{si} \quad (17)$$

$V_{pi}$≡p-wave velocity
$V_{si}$≡s-wave velocity
$P_i$≡density
i≡layer index
θ≡angle of incidence Equations (1) and (2) are, of course, the two basic equations of wave travel in an earth formation and are for isotropic media with the layer index being i=1 for the incident medium and i=2 for the underlying medium. Equations (3) through (17) simply define intermediate variables.

As an example of calculations associated therewith, if θ=0° (normal incidence), the P-wave reflection coefficient Apr is equal to about −0.16 and +0.16, viz., as related to the top of gas sand 11 and to the base of the sand 11 respectively.

FIG. 3 illustrates change in reflection coefficient as a function of angle of incidence θ for the three-layer model of FIG. 2.

Note that solid lines 20, 21 illustrate the effects of reflection (and transmission, by omission) on the base and top of the gas sand. In line 21, at θ=0°, note that the $A_{pr}$ equals −0.16; while at θ=40°, the $A_{pr}$ is about −0.28. That is, rather a surprisingly large change in the reflection coefficient as a function of angle of incidence occurs, with the greatest change occurring between θ=20° and θ=40°.

For the bottom layer, line 20 changes at about the same rate, but in opposite sign. I.e., at θ=0°, $A_{pr}$ is about +0.16 and at θ=40°, $A_{pr}$ is about +0.26. Again, the greatest change in $A_{pr}$ occurs between θ=20° and θ=40°. As a result, the amplitude of the seismic wave reflected from this model would increase about 70% over the angle of incidence range shown, i.e., over the incremental 40 degrees shown.

While angles of incidence equal to 40° may seem a little large for reflection profiling (heretofore, most data arriving beyond 30° being thought useless and muted out), experience has now nevertheless shown that reflection data can and do arrive at reflection angles greater than 30°. Hence, the angles of incidence must be determined, and the straight-ray approach to estimate such angles of incidence (using depth-to-reflector and shot-to-detector and-shot-to-group offset), is useful.

FIG. 4 illustrates another plot associated with a three-layer model akin to that shown in FIG. 3, but in which the sandstone contains gas but is buried deep below the earth's surface. The values for the three-layer model of FIG. 2 are again used except that the velocity change from shale to sand is only 10%, or from 10,000'/sec to 9000'/sec. As shown, curves 25, 26 are even more significant: both curves are seen to increase in magnitude from over the 40° of change in the angle of incidence. However, field results have not verified these results, prior to the inventions described in the above applications, since Poisson's ratio in such gas sands may be strongly affected by depth.

FIG. 5 is a diagram which illustrates a data "addressing" technique as practiced by the present invention; in the figure, the traces are generated using an end-shooting array of 48 detectors with source and detectors advancing one detector interval per shot point. Result: a 24-fold CDP-stacked record section. Note further: each centerpoint is associated with 24 separate traces of varying offset.

To further understand the nature of FIG. 5, assume that the sources $S_1, S_2 \ldots S_n$ are sequentially located at shotpoints $SP_1, SP_2 \ldots SP_n$ at the top of the Figure. Assume also that the detectors are placed in line with the sources, i.e., along the same line of survey A at the detector locations $D_1, D_2 \ldots D_m$. After each source is activated, reflections are received at the detectors, at the locations shown. Then by the "rollalong" technique, the source and detector spreads can be moved in the direction B of survey line A and the process repeated to provide a series of traces. The latter are associated with centerpoints midway between the respective detector-source pairs. In the figure, assume source $S_1$ has been located at shotpoint $SP_1$ and excited. Midway between $SP_1$ and each of the detectors, at $D_1, D_2 \ldots D_m$ is a series of centerpoints $C_1, C_2 \ldots C_n$. The latter are each associated with a trace. In this regard and for a further description of such techniques, see U.S. Pat. No. 3,597,727 for "Method of Attenuating Multiple Seismic Signals in the Determination of Inline and Cross-Dips Employing Cross-Steered Seismic Data", Judson et al., issued Aug. 3, 1971, and assigned to the assignee of the present application. With appropriate static and dynamic corrections, the data can be related to the common centerpoints midway between individual source points and detectors, as discussed in the above-noted reference.

But by such a field technique, data provided generate 24 separate traces associated with the same centerpoint $C_1 \ldots C_n$. To correctly index ("address") these traces as a function of several factors including horizontal offset and centerpoint location, involves the use of stacking chart 44.

FIG. 6 illustrates stacking chart 44 in detail.

As shown, Chart 44 is a diagram in which the traces are associated with either a plurality of oblique common profile lines $PL_1, PL_2 \ldots$, or a series of common offset and centerpoint locations at 90 degrees to each other. For best illustration, focus on a single shotpoint, say $SP_1$, and on a single detector spread having detectors $D_1, D_2 \ldots D_m$ of FIG. 6 along survey line A. Assume a source is located at shotpoint $SP_1$ and activated thereafter. The detector spread and source are "rolled" forward along survey line A in the direction B, being advanced one station per activation. Then after detection has occurred, and if the resulting centerpoint pattern is rotated 45° about angle 46 to profile line $PL_1$ and projected below the spread as in FIG. 6 as a function of common offset values and centerpoint positions, the chart 44 of FIG. 6 results. Of course, each centerpoint has an amplitude vs. time trace associated therewith, and for didactic purposes that trace can be said to project along a line normal to the plane of the figure.

It should be emphasized that the centerpoints provided in FIGS. 5 and 6 are geographically located along the line of survey A in line with the source points $SP_1$, $SP_2$... As the locational traces are generated, the chart 44 aids in keeping a "tag" on each resulting trace. As the detector spread and sources are rolled forward one station and the technique repeated, another series of traces is generated associated with centerpoints on new profile line $PL_2$. That is, although the centerpoints are geographically still associated within positions along the survey line A of FIG. 5, by rotation along the angle 46, the new centerpoint pattern $C_1', C_2' \ldots C_n'$ can be horizontally and vertically aligned with centerpoints previously generated. I.e., at common offset values (in horizontal alignment) certain centerpoints are aligned, viz., centerpoint $C_1$ aligns with $C_1'$ as shown; further $C_2$ is aligned with $C_2'$, etc. Also, there are traces that have common centerpoints. I.e., at common centerpoints (in vertical alignment) centerpoint $C_2$ aligns with centerpoint $C_1'$, and centerpoints $C_3, C_2'$ and $C_1''$ are similarly aligned. Thus, via chart 44, each trace associated with a centerpoint can be easily "addressed" as to:

(i) its actual geographical location (i.e., along phantom lines normal to diagonal profile lines $PL_1, PL_2 \ldots$ along common location lines $LL_1, LL_2 \ldots$), so that its actual field location is likewise easily known;

(ii) its association with other traces along common horizontal offset lines $COL_1, COL_2 \ldots COL_x$; and (iii) its association with still other traces along common vertical centerpoint location lines $CPL_1, CPL_2 \ldots$ Also, "addressing" the traces allows such traces to be used to generate semblance coefficients, followed by enhancement of the original traces using amplitude projection (of the trace gather) to new "near" and "far" offset locations; thereafter, difference envelope generation occurs using the resulting traces, as in the manner of FIGS. 7, 8 and 9. Briefly, as shown in FIG. 9, by using only the weighted variation between envelopes of the near and far offsets, the interpreter can more readily determine valuable characteristics, such as the fluid hydrocarbon-bearing potential and lithology of the host media, while simplifying the number of parameters required to render a viable display of such data. That is to say, changes in weighted envelope amplitude are distinct, say at 90, 91, in FIG. 9, so that fluid hydrocarbon-bearing potential and lithology of the host media, are easily determinable from the resulting displays.

Now, in more detail, FIGS. 7, 8 and 9 are flow diagrams illustrative of a computer-dominated process in which the functions required by the method of the present invention can be easily ascertained. While separate displays of the near and far traces—as side-by-side sections—provide for trustworthy interpretations for the most part, there are situations where amplitude differences between sections are difficult to detect. In those cases, it is desirable to highlight such trace differences in a systematic manner as, say, a functional amplitude difference versus common centerpoint location and time. Preliminary to the steps shown in FIG. 7, assume that a section of seismic data has been analyzed for "bright spots"; such events are known by geographical location and/or a time/depth basis; and the traces have been dynamically and statically corrected, as hereinbefore described.

The steps of FIGS. 7, 8 and 9 include generating addresses for the data that include a common offset address in the manner of FIG. 2, common centerpoint address and an actual geographical location address also in the manner of FIG. 2.

First, semblance coefficients as a function of time and common centerpoints are generated, say of the following form, and then stored off-line.

$$S_c = \frac{1}{M} \frac{\sum_{j=K-\frac{1}{2}N}^{K+\frac{1}{2}N} \left[ \sum_{i=1}^{M} [f(i,j)] \right]^2}{\sum_{j=K-\frac{1}{2}N}^{K+\frac{1}{2}N} \sum_{i=1}^{M} [f(i,j)]^2}$$

where: $f(i,j)$ is the $j^{th}$ sample of the $i^{th}$ trace; M traces are summed and the coefficient $S_c$ is evaluated over a window of width N, centered at point k on the original time sample.

Neidell and Taner describe such processing in some detail in "Semblance and Other Coherence Measures for Multichannel Data" *Geophysics*, Vol. 36, No. 3, pp. 482–497 (1971) but not for the purpose or in the context here employed. The process is equivalent to the zero-lag value of the autocorrelation of the sum of the traces divided by the mean of the zero-lag values of the autocorrelations of the component traces.

Hence, in effect, the process is a measure of the normalized ratio of signal and noise energy to signal energy alone (output-to-input) that results from stacking several traces so that the similarity of time of a limited number of phases of seismic events (but *not* noise) associated with fluid hydrocarbon-bearing strata, can be indicated.

Next, near and far traces (and ultimately envelope difference sections thereof) are generated based on an analytic relationship that first best approximates the actual variation in amplitude versus offset within each gather of traces for a series of time samples and then determines the projected amplitudes of the near and far traces based on the functional form of the best fitting linear or quadratic equation descriptive of the field data. In such determination, least squares fitting of the data of each gather involves the solution of several hundreds of equations simultaneously. In reducing the massive amounts of data to manageable porportions, the use of the matrix form of such equations is desirable. Finally, the differences in the envelopes of the near and far traces are modified by the stored semblance coefficients previously generated, and the ultimate weighted difference envelopes are displayed as a function of centerpoint location along the line of survey. Result: the character of the amplitude of the event of interest can be easily indicated as a function of changing centerpoint locational values. If the event character is emphasized in the envelope difference section (indicating an abrupt amplitude change vis-a-vis common events in the near and far traces normalized to common centerpoint location), then there is a high likelihood that the event is indicative of strata containing fluid hydrocarbons. Also the lithology of the host strata is easily determined based on the assumption and operations described in detail in the above-identified applications as well as in less detail below.

In more detail, after the addresses have been generated, amplitudes of side-by-side traces of each gather can be re-indexed as a function of time and offset. That is to say, for a time sample, say time sample $T_1$, of the trace gather $G_1$, all amplitudes for that sample are first re-indexed as a function of offset (if not already so ordered, see FIG. 10A). After the semblance data has been generated and stored as previously indicated, next, the generated data are compared to a series of analytic functions and the "best fit" determined based on a least-square analysis. That is to say, the linear or quadratic equation that best fits the data is the one in which the sum of the squares of the distances (associated with the amplitudes of the trace gather) is minimum.

In order to simplify the step of best fitting the form of the actual data to a specified linear or quadratic equation, usually three mathematical functions are specified: a linear equation of the form $A(x)=C_0+C_1x$; and quadratic equations of the form $A(x)=C_0+C_2x^2$ and $A(x)=C_0+C_1x+C_2x^2$ where $A(x)$ is the variation in amplitude of the data as a function of offset and $C_0$, $C_1$ and $C_2$ are constants determined by a pseudo inverse matrix method set forth below. After a best fit of the data associated with the time sample $T_1$ has been obtained, the near and far ofset amplitude values are next generated based on the functional form of the best fitting equation and constants, see FIG. 10B. The data is then stored. Then after the near and far offset amplitudes associated with the remaining time samples $T_2 \ldots T_j$ of the gather $G_1$ have been generated, the process is repeated for neighboring gathers $G_2 \ldots G_j$.

Next, the envelopes of the amplitudes of each of the near and far traces are generated using conventional averaging processing, (say using the root mean square of many amplitude values associated with the zero and 90° wavelets of the stored data, i.e., using several amplitude samples over several time samples first at zero phase and then shifted in phase 90°), followed by the subtraction of the generated envelopes (one from the other) as a function of common centerpoint location. The resulting difference envelope is next modified by appropriate semblance coefficients followed by displays of the weighted envelope as a function of centerpoint values along the line of survey, as shown in FIG. 9. The displayed difference envelope has been found to be very reliable since any one segment of the plot is an average of several amplitude values over many time samples. Hence, noise within the original section tends to be suppressed.

For generating near and far offset traces (and ultimately envelope difference sections thereof), offset values (to which the field data is to be projected which of course are outside of the set of offsets associated with the traces of each original gather) must be chosen. In the case of the near offset location, the choice is a conventional one—zero (FIG. 10B). That is to say, for the linear or quadratic equations set forth above x is set equal to zero and the amplitude solutions as a function of different time samples $T_1 \ldots T_j$, determined. While in the process of generating near trace data, the choice can be said to be somewhat obvious (i.e., setting X to zero in either equation (i), (ii), or (iii), not so in the case of far offset trace and section determination.

For generating such far offset traces and sections, the offset values chosen must not only be constant and outside the set of usual offset values of the common gather (as in near trace processing), but also they must be values customarily acceptable to those skilled in the art. In this regard, mute offsets as used in conventional seismic processing, have been found to be adequate. Also offset locations associated with common emergence angles of adequate frequency content are likewise useful. In that way, the offset values chosen for far projection purposes are those values either (i) that are conventionally associated with the process of excluding from the early parts of the long offset traces, signals dominated by refraction energy, or (ii) that are associated with emergence angles such that a long offset trace associated therewith has a frequency content that is not appreciably lower than those of other neighboring traces.

However, the space coordinates of the final traces is *not* an offset coordinate but in fact is a centerpoint location that is common to the common gather from which the near and far traces were produced. Hence the resulting weighted differences in their envelopes easily correlate with actual field addresses.

In carrying out the above processes on a high-speed basis, a fully programmed digital computer can be useful, and moreover is the best mode for carrying out the present invention. But electromechanical systems well known in the art can also be used. In either case, the field traces must first undergo static and dynamic correction before the traces can be displayed as a function of offset to determine their potential as a gas reservoir. Such correction techniques are well known in the art — see, e.g., U.S. Pat. No. 2,838,743, of O. A. Fredriksson et al, for "Normal Moveout Correction with Common Drive for Recording Medium and Recorder and/or Reproducing Means", assigned to the assignee of the present application, in which a mechanical device and method are depicted. Modern processing today uses properly programmed digital computers for that task in which the data words are indexed as a function of, inter alia, amplitude, time, datum height, geographical location, group offset, velocity, and are manipulated to correct for the angular and horizontal offset; in this latter environment, see U.S Pat. No. 3,731,269, Judson et al, issued May 1, 1973, for "Static Corrections for Seismic Traces by Cross-Correlation Method", a computer-implemented program of the above type also assigned to the assignee of the present invention. Electromechanical sorting and stacking equipment is also well known in the art and is of the oldest ways of canceling noise. See, for example, the following patents assigned to the assignee of the present invention which contain sorting and stacking techniques, including beam steering techniques:

| U.S. Pat. No. | Issued | Inventor | Title |
| --- | --- | --- | --- |
| 3,597,727 | 12/30/68 | Judson et al | Method of Attenuating Multiple Seismic Signals in the Determination of Inline and Cross-Dips Employing Cross-Steered Seismic Data |
| 3,806,863 | 4/23/74 | Tilley et al | Method of Collecting Seismic Data of Strata Underlying Bodies of Water |
| 3,638,178 | 1/25/72 | Stephenson | Method for Processing Three-Dimensinal Seismic Data to Select and Plot Said Data on a Two-Dimensional Display Surface |
| 3,346,840 | 10/10/67 | Lara | Double Sonogramming for Seismic Record Improvement |
| 3,766,519 | 10/16/73 | Stephenson | Method for Processing Surface Detected Seismic Data to Plotted Repre- |

-continued

| U.S. Pat. No. | Issued | Inventor | Title |
|---|---|---|---|
| | | | sentations of Subsurface Directional Seismic Data |
| 3,784,967 | 1/8/74 | Graul | Seismic Record Processing Method |
| 3,149,302 | 9/15/74 | Klein et al | Information Selection Programmer Employing Relative Amplitude, Absolute Amplitude and Time Coherence |
| 3,149,303 | 9/15/64 | Klein et al | Seismic Cross-Section Plotter |

FIG. 11 illustrates particular elements of a computing system for carrying out the steps of FIGS. 7, 8, 9, 10A and 10B. While many computing systems are available to carry out the process of the invention, perhaps to best illustrate operations at the lowest cost per instruction, a microcomputing system 50 is didactically best and is presented in detail below. The system 50 of FIG. 11 can be implemented on hardware provided by many different manufacturers, and for this purpose, elements provided by Intel Corporation, Santa Clara, Calif. may be preferred. However, where a central center for seismic data processing is available, a large main-frame computing system (such as an IBM 370/65) is usually already in place; and thus for most applications involving the present invention, such a system becomes the best mode for carrying it out.

System 50 can include a CPU 51 controlled by a control unit 52. Two memory units 53 and 54 connect to the CPU 51 through BUS 55. Program memory unit 53 stores instructions for directing the activities of the CPU 51 while data memory unit 54 contains data (as data words) related to the seismic data provided by the field acquisition system. Since the seismic traces contain large amounts of bit data, an auxiliary memory unit 55 can be provided. The CPU 51 can rapidly access data stored through addressing the particular input port, say at 56 in the figure. Additional input ports can also be provided to receive additional information as required from usual external equipment well known in the art, e.g., floppy disks, paper-tape reader, etc., including such equipment interfaced through input interface port 57 tied to a keyboard unit 58 for such devices. Using clock inputs, control circuitry 52 maintains the proper sequence of events required for any processing task. After an instruction is fetched and decoded, the control circuitry issues the appropriate signals (to units both internal and external) for initiating the proper processing action as set forth above.

In addition to providing both mathematical projections of the trace data of each original gather and weighted displays of the envelope differences of such projections, the system 50 can also allow for the testing of the contents of the projections against certain known trends in the original data to better pinpoint the fluid hydrocarbon-bearing potential and/or the lithology of the surveyed earth formation. Such decisions relate to certain relationships inherently involved in the data.

Note that prior related patent applications, op. cit., teach that zones of gaseous hydrocarbon accumulation can be accurately identified by determining if first high-intensity events exist in the trace gathers of interest and then next if the events can be associated with the presence of gaseous hydrocarbons, viz., answering the question, "Does the amplitude of such events change progressively as a function of horizontal offset?", in the affirmative. Such a conclusion involves a precursor step in which the events of interest (from one gather with same event in another gather) are contrasted with each other. And if there appears to be a detectable change in the amplitude character of the event of interest, say a reversal in UP- or DOWN-scale trend, then the conclusion that such change was brought about by the presence of gaseous hydrocarbons has a high probability of being true. And after interrogation via a look-up table, the lithologic character of the underlying strata is also capable of determination.

Such decisions and the results of those decisions are automatically controlled by the system 50. After picking and codifying the amplitudes of the event(s) of interest, i.e., projecting near and far amplitudes via a least-squares fit, the system 50 also can automatically determine their UP- or DOWN-scale trend; determine if the trend is a reversal of prior calculated data, and depending on whether or not a reversal is found (assume that it has been), highlight the reversal; and then compare its direction with single-variable lithology table so as to indicate both the gas-bearing potential and the lithology of the strata. With regard to the operation of the latter table, it comprises a LOOK-UP function in which the UP- or DOWN-scale trend of the amplitude direction (with offset) of the individual gather triggers the printing of an appropriate lithologic tag.

For outputting information, the system 50 can include a printer unit 59 by which say, the results of the lithology determination steps (of the interrogation of the lithology LOOK-UP table) are printable.

Of more use as an output unit, however, is disk unit 60, which can temporarily store the data. Thereafter, an off-line digital plotter capable of generating a series of weighted displays of the difference envelopes of the near and far traces is used in conjunction with the data on the disk unit 60. Such plotters are available in the art, and one proprietary model that I am familiar with uses a computer-controlled CRT for optically merging onto photographic paper, as a display mechanism, the seismic data. Briefly, in such a plotter the data are converted to CRT deflection signals, the difference in envelopes of the traces normalized to a common centerpoint is drawn on the face of the CRT and indicated, say via photographic film. After a predetermined number of lines have been drawn, the film is processed in a photography laboratory and hard copies returned to the interpreters for their review.

PSEUDO INVERSE MATRIX EQUATIONS

Assume that these N traces per gather with offsets Xj and amplitudes Aj available for processing an that the analytic functions are of the form previously described, viz:

$$A(j) = C_0 + C_1 x \tag{B}$$

$$A(j) = C_0 + C_2 x^2 \tag{C}$$

$$A(j) = C_0 + C_1 x + C_2 x^2 \tag{D}$$

For equation (C) least-squares solution in matrix form for constants $C_0$ and $C_2$ is:

$$\begin{bmatrix} C_0 \\ C_2 \end{bmatrix} = \begin{bmatrix} N & \Sigma X_i^2 \\ \Sigma X_i^2 & \Sigma X_i^4 \end{bmatrix}^{-1} \cdot \begin{bmatrix} \Sigma A_i \\ \Sigma A_i X_i^2 \end{bmatrix}$$

Letting:

$$DET = N \cdot \Sigma X_i^4 - (\Sigma X_i^2)^2$$

Then the evaluation of Constants $C_0$ and $C_2$ are further simplified:

$$C_0 = \frac{\Sigma X^4}{DET} \cdot \Sigma A_i - \frac{\Sigma X^2}{DET} \cdot \Sigma A_i X_i^2$$

$$C_2 = \frac{\Sigma X^2}{DET} \cdot \Sigma A_i - \frac{N}{DET} \cdot \Sigma A_i X_i^2$$

As the amplitudes of the near and far traces are projected, such processing involves substitution of a finite offset value, i.e., offest value Xp, in the above equations, as follows:

Projection at offset Xp:

$$A(Xp) = C_0 + C_2 Xp^2$$
$$= \frac{\Sigma X^4 - Xp^2 \Sigma X^2}{DET} \cdot \Sigma A_i$$
$$+ \frac{NXp^2 - \Sigma X^2}{DET} \cdot \Sigma A_i X_i^2$$
$$= \Sigma W_i A_i$$

where:

$$W_i = \frac{\Sigma X^4 - Xp^2 \Sigma X^2}{DET} + \frac{NXp^2 - \Sigma X^2}{DET} \cdot X_i^2$$

And: $W_i = K_0 + K_2 \cdot X_i^2$

Moreover, since the constants $K_0$ and $K_2$ are easily evaluated, equation (C) can be rapidly solved.

In like manner, equations (B) and (D) are also solvable. For equation (B), e.g., application of the above matrix form provides for a projection at $X_p$ of the form:

$$A(X_p) = \Sigma W_j A_j$$
where: Letting $DET = N \cdot \Sigma X^2 - (\Sigma X)^2$ $$W_i = \frac{\Sigma X^2 - X_p \Sigma X}{DET} + \frac{NX_p - \Sigma X}{DET} \cdot X_i$$

or $W_i = K_0 + K_1 \cdot X_i$

Note that in the above form, that if the projected offset location is about equal to $\frac{2}{3}$ of the maximum offset value, then $$Xp = \Sigma X^2 / \Sigma X \approx \tfrac{2}{3} x_{max};$$

$K_0 = 0$; and $W_i = K_1 X_i$

Likewise for equation (D), application of the above matrix form provides for a projection of Xp of the form $$A(Xp) = \Sigma W_i A_i$$

where:

$$W_i = K_0 + K_1 X_i + K_2 X_i^2$$

and $$K'_s = f(\Sigma X_i, \Sigma X_i^2, \Sigma X_i^3, \Sigma X_i^4, Xp, N)$$

In carrying out the above processes on a high-speed basis, a fully programmed digital computer can be most useful, and moreover is the best mode for carrying out the present invention. But electromechanical systems well known in the art can also be used. In either case, the data representing the weighed envelope differences of the near and far traces are systematically generated to provide for the easy identification of the gas-bearing potential and lithology of the surveyed earth formation.

EXAMPLES

Authentication capability provided by the method of the present invention is better illustrated in the Examples set forth below.

EXAMPLE I

Seismic data were obtained in the Sacramento Valley, Calif. These data, in raw form, are shown in FIG. 12. Three discovery wells (located at about CP-109, CP-98 and CP-85) penetrate a 100-foot sand which is almost fully gas-saturated. The developed portion of the field extends from about CP-130 to CP-75. Gas occurs at about a depth of about 7,000 feet which corresponds to a time of about 1.7 seconds on the plots.

Raw and enhanced envelope difference plots (both derived from the same identical envelopes of associated near and far traces) are shown in FIGS. 13 and 14 respectively. Note by comparing the plots that the amplitudes over the region and depth of interest, that the semblance-treated difference envelope of FIG. 14 allows the interpreter to more easily correlate amplitude versus offset events over the depth of interest, than does the untreated plot.

EXAMPLE II

Seismic data obtained from Alaska are depicted in CDP-gathered form in FIG. 15. Discovery wells (located at about CP-140 and CP-110) penetrate a series of stringers containing gaseous hydrocarbons. The lateral extent of the field is from about CP-105 to CP-150. The average depth is about 3500 feet (for the field) which corresponds to a time of about 0.9 seconds on the plot.

An enhanced envelope difference plots (derived from envelopes of associated near and far traces) is shown in FIG. 16. Note by comparing the plots that the amplitudes over the region and depth of interest, that the semblance-treated difference envelope of FIG. 15 allows the interpreter to more easily correlate amplitude versus offset changes over the depth of interest.

It should be understood that the invention is not limited to any specific embodiments set forth herein as variations are readily apparent to those skilled in the art. For example, once the traces have been treated statically and dynamically and semblance coefficients generated, they can be injected into the process at several levels, singly or in combination. Instead of using such values to modify the difference envelopes, for example, they could be used to separately weight each near and far envelope prior to the creation of the associated difference envelope, or used to modify the traces themselves where the latter are displayed on a side-by-side basis. Also, while it is preferable to have the semblance coefficients generated by a batch process separate from creation of the re-indexed near and far traces and/or their envelopes simultaneous processing could occur, if desired.

Thus, the invention is to be given the broadest possible interpretation within the terms of the following claims.

What is claimed is:

1. A method for determining fluid hydrocarbon-bearing potential and/or lithology of strata in the earth using high-intensity amplitude events in seismic records generated by conventional centerpoint seismic collection and processing techniques in which the presence of refraction energy within said records has been minimized, comprising the steps of:

(a) generating seismic data by said conventional centerpoint seismic collection and processing techniques including recording signals from acoustic discontinuities associated with said strata of interest by positioning and employing an array of sources and detectors such that centerpoints between selected pairs of sources and detectors form a series of centerpoints along a line of survey, said recorded signals being the output of said detectors;

(b) by means of automated processing means, statically and dynamically correcting said recorded signals to form corrected traces whereby each of said corrected traces is associated with a centerpoint horizontally midway between a source-detector pair from which said each corrected trace was originally derived;

(c) by means of automated processing means, indexing said corrected traces so that each of said corrected traces is identified in its relationship to neighboring traces on the basis of progressive changes in common centerpoint location;

(d) by a high-amplitude event of interest, determining from among a series of analytic functions of known mathematical character, a best fit to amplitude vs. horizontal offset variations of a gather of said corrected traces, said gather of traces being ientified with a common centerpoint location and a set of progressively changing horizontal offset values;

(e) predicting near and far amplitude vs. time trace projections or representations of said projections for said gather of corrected traces at new offset locations based on said best fitting analytic function, said predicted near and far offset trace projections or representations being identified with offset locations falling on opposite sides of said set of changing horizontal offset values;

(f) generating a first envelope of said trace amplitude projections of step (e) associated with near offset locations and a second amplitude envelope of said trace projections of step (e) associated with far offset locations and subtracting the two envelopes one from the other to form a difference envelope;

(g) weighting said difference envelope of step (f) by the normalized semblance coefficients wherein after ratios of output-to-input energy are generated by stacking, events in said traces associated with a limited number of phases are better indicated;

(h) displaying said weighted difference envelope of step (g) so as to depict amplitude vs. time change as a function of centerpoint coordinate values so that progressive change in said high-intensity amplitude event in said displayed traces is identified as a function of progressive change in centerpoint values.

2. The method of clam 1 in which said one of said series of analytic function of known mathematical character of step (d) is selected from a group of linear and quadratic equations of the form:

$A(x) = C_0 + C_1 x;$ $A(x) = C_0 + C_2 x^2;$ and $A(x) = C_0 + C_1 x + C_2 x^2$ 3. Method of claim 2 in which step (e) of predicting near and far trace projections is in accordance with solution of the general equation $A(x) = \Sigma W_j A_j$ in matrix format, where:

$W_j$ is a function that varies with the selected linear or quadratic equation that best fits with the said amplitude vs. time variations of the trace gathers, and $A_j$ is the amplitude of the gathers for the time samples $T_1 \ldots T_j$.

4. Method of claim 3 where step (e) of predicting projection amplitudes provides that such projections be for an offset location at $X_p$ and wherein $W_i$ in the general equation $A(x) = \Sigma W_i A_i$ is equal to:

$$\frac{\Sigma X^4 - X_p^2 \Sigma X^2}{DET} + \frac{NX_p^2 - \Sigma X^2}{DET} \cdot X_i^2$$

or $W_i = K_o + K_2 \cdot X_i^2$
where: $DET = N \cdot \Sigma X_i^4 - (\Sigma X_i^2)^2$ and N is the number of traces in each common gather.

5. Method of claim 3 where step (e) of predicting projection amplitudes provides that such projections be for an offset location at $X_p$ and wherein $W_i$ of the general equation $A(x) = \Sigma W_i A_i$ is equal to $$W_i = \frac{\Sigma X^2 - X_p \Sigma X}{DET} + \frac{NX_p - \Sigma X}{DET} \cdot X_i$$

or $W_i = K_o + K_i \cdot X_i$
where: $DET = N \cdot \Sigma X^2 - (\Sigma X)^2$ and N is the number of traces in each gather.

6. Method of claim 3 where step (e) of predicting projection amplitudes provides that such projections be for an offset location at $X_p$ and where $W_i$ of the general equation $A(x) = W_i A_i$ is equal to:

$W_i = K_0 + K_1 X_i + K_2 X_i^2$ and $'_s = f(\Sigma X_i, \Sigma X_i^2, \Sigma X_i^3, \Sigma X_i^4, X_p, N)$ where N is the number of traces of each common gather.

7. The method of claim 3 in which each of said near amplitude vs. time trace projections of step (e) is determined by solving said general equation $A(x) = \Sigma W_i A_i$ in matrix form for location $X = 0$.

8. The method of claim 3 in which each of said far amplitude vs. time trace projections of step (e) is determined by solving said general equation $A(x) = \Sigma W_i A_i$ in matrix form for the far offset location x = the mute offset location for CDP processing of said corrected traces.

9. The method of claim 4 in which each of said far amplitude vs. time trace projections of step (e) is determined by solving said general equation $A(x) = \Sigma W_i A_i$ in matrix form for the far offset location $x =$ the offset location used for CDP pocessing of said corrected traces so as to provide for an emergence angle of minimum acceptable trace distortion.

10. A method for converting an original multitrace seismic record into an improved section having increased capability as to the fluid hydrocarbon-bearing potential and/or lithologic nature of high-intensity amplitude events related to reflections from subsurface strata, said improved section being composed of a plurality of amplitude-versus-centerpoint-and-time traces, said original record consisting of a plurality of multitrace seismic traces of amplitude-versus-horizontal coordinate-and-time generated by conventional centerpoint seismic collection and processing techniques in which the presence of refraction energy within said records has been minimized, each of said traces constituting energy derived in association with a particular source-detector pair of known horizontal offset and of known centerpoint location, and representing, in part, event reflections from said subsurface strata, said conversion comprising the steps of:

(a) classifying said original traces on the basis of common but progressively changing horizontal offset values and common centerpoint locations, whereby each resulting trace is identified by a centerpoint location common to at least another trace and a known horizontal offset value;

(b) for a high-intensity event, determining with regard to a series of analytic functions of known mathematical character, that one of said series is the best fit to amplitude vs. time variations of said each resulting trace and said at least another trace;

(c) predicting near and far amplitude vs. time trace projections for said resulting and another traces at new offset locations based on said one, best fitting analytic function;

(d) generating a first series of trace amplitude projections vs. time of step (c) associated with near offset locations, and a second series of trace amplitude projections vs. time associated with far offset locations and subtracting increments of said first and second series normalized to the same time sample, one from the other to form at least a segment of said improved section;

(e) weighting said subtracted increments of step (d) by semblance coefficients wherein after ratios of output-to-input energy is generated by stacking, events in said increments associated with a limited number of phases are better indicated;

(f) displaying said improved section depicting amplitude change as a function of time and centerpoint coordinate so that progressive change in said high intensity amplitude event in said displayed traces is identified as a function of progressive change in centerpoint values.

* * * * *